United States Patent
Schmidt et al.

(10) Patent No.: US 12,090,703 B2
(45) Date of Patent: Sep. 17, 2024

(54) DEVICE OF A BLOW-MOULDING APPARATUS

(71) Applicant: Eugen Seitz AG, Wetzikon (CH)

(72) Inventors: Joachim Schmidt, Hettlingen (CH); Roland Schnetzer, Tagerwilen (CH)

(73) Assignee: Eugen Seitz AG, Wetzikon (CH)

( * ) Notice: Subject to any disclaimer, the term of this patent is extended or adjusted under 35 U.S.C. 154(b) by 74 days.

(21) Appl. No.: 17/732,035

(22) Filed: Apr. 28, 2022

(65) Prior Publication Data

US 2022/0347910 A1 Nov. 3, 2022

(30) Foreign Application Priority Data

Apr. 29, 2021 (EP) .................................... 21171204

(51) Int. Cl.
*B29C 49/42* (2006.01)
*B29C 49/28* (2006.01)

(52) U.S. Cl.
CPC .... *B29C 49/4289* (2013.01); *B29C 49/28008* (2022.05); *B29C 2049/4294* (2013.01)

(58) Field of Classification Search
CPC ........ B29C 49/4289; B29C 2049/4294; B29C 49/28008
See application file for complete search history.

(56) References Cited

U.S. PATENT DOCUMENTS

| | | | |
|---|---|---|---|
| 7,674,108 B2 | 3/2010 | Lemaistre | |
| 7,927,093 B2 | 4/2011 | Leblond | |
| 2008/0213423 A1 * | 9/2008 | Leblond | B29C 49/42 425/536 |
| 2020/0238588 A1 * | 7/2020 | Finger | B29C 49/783 |

FOREIGN PATENT DOCUMENTS

| | | | | |
|---|---|---|---|---|
| EP | 2402143 A1 | 1/2012 | | |
| EP | 2610535 A1 * | 7/2013 | ......... | B29C 49/4289 |
| EP | 3530431 A1 | 8/2019 | | |
| WO | 0234500 A1 | 5/2002 | | |
| WO | 2012034953 A1 | 3/2012 | | |
| WO | WO-2019105783 A1 * | 6/2019 | ......... | B29C 49/4289 |

OTHER PUBLICATIONS

Machine translation of WO 2019/105783 A1 dated Jun. 2019. (Year: 2019).*

* cited by examiner

*Primary Examiner* — Robert B Davis
(74) *Attorney, Agent, or Firm* — The Webb Law Firm

(57) ABSTRACT

A device of a blow-moulding apparatus for moulding hollow bodies, in particular a stretch blow-moulding machine, is disclosed. The device includes a housing block with a through-bore, at least one valve with a movable piston and with a valve chamber, a first channel which runs in the housing block and which connects the valve chamber to the through-bore, a second channel which connects the valve chamber to an external line, and a cover for fastening the valve to the housing block. The valve connects the first channel and the second channel to one another and separates them from one another. The second channel runs at least partially in the cover and/or at least one part of the valve chamber is arranged in the cover and surrounds the piston. The device is small and compact and the valves may be replaced in a simple manner.

23 Claims, 9 Drawing Sheets

DEVICE OF A BLOW-MOULDING APPARATUS

CROSS-REFERENCE TO RELATED APPLICATION

This application claims priority to European Patent Application No. 21 171 204.7 filed Apr. 29, 2021, the disclosure of which is hereby incorporated by reference in its entirety.

BACKGROUND OF THE INVENTION

Field of the Invention

The present invention relates to a device of a blow-moulding apparatus for moulding hollow bodies, in particular a stretch blow-moulding machine. The device is, in particular, a valve unit.

Description of Related Art

Blow-moulding apparatuses or blow-moulding machines for moulding hollow bodies are sufficiently well known from the prior art. Generally a pre-heated preform made from a thermoplastic material, preferably made from polyethylene terephthalate (PET), is connected to a blowing nozzle of the blow-moulding machine. The preform is expanded by blowing in a process gas, preferably compressed air. The desired shape may be achieved by using blow moulds. Depending on the method, only blow-moulding is carried out, or the blank, i.e. the preform, is additionally stretched during the blow-moulding process by means of a displaceable mandrel or a displaceable stretching rod. This second method is called stretch blow-moulding.

The process gas is generally blown in via two or more steps. The pre-blowing takes place at a lower pressure than the subsequent main blowing. During the venting of the hollow body after the blow-moulding process, the process gas, in particular compressed air, is recovered and/or conducted to the outside.

The individual blow-moulding steps and the venting are controlled by means of valves. The production or moulding of such hollow bodies by means of blow-moulding machines takes place within a few seconds, preferably within 1 to 3 s. The fluid connections between the valves and the blowing nozzle should thus be as short as possible and dead spaces should be minimized as far as possible.

WO 02/34500 discloses a blow-moulding machine with a compact valve unit which has a housing block for receiving the blowing nozzle and a plurality of valves arranged thereon. The blowing-air channels run in the housing block.

U.S. Pat. No. 7,674,108 B2 discloses a blow-moulding machine with a valve unit in which the valves are incorporated in the form of cartridges in the housing block. This is intended to keep the fluid connections short and facilitate the replacement of the valves.

U.S. Pat. No. 7,927,093 B2 proposes to arrange all of the process valves together in a single housing on one side of the housing block and to attach a second housing, in which all of the supply channels and the venting channel for the process air run, to the opposing side of the housing block. The second housing produces the connections between external lines and the channels running in the housing block.

SUMMARY OF THE INVENTION

It is desirable, therefore, to provide a device for a blow-moulding apparatus which permits an arrangement of the valves which is as compact as possible, wherein the valves are nevertheless replaceable in a simple manner.

The device according to the invention of a blow-moulding apparatus for moulding hollow bodies, in particular a stretch blow-moulding machine, comprises:
- a housing block with a through-bore for at least partially receiving a blowing nozzle of the blow-moulding apparatus which may be connected to the hollow body,
- at least one valve with a movable piston and with a valve chamber,
- a first channel which runs in the housing block and which connects the valve chamber to the through-bore,
- a second channel which connects the valve chamber to an external line and
- a cover for fastening the valve to the housing block.

The valve connects the first channel and the second channel to one another and separates them from one another.

According to the invention, the second channel runs at least partially in the cover and/or at least one part of the valve chamber is arranged in the cover and surrounds the piston.

The valve chamber is that space into which the first channel and the second channel lead and which is defined by the piston. When the valve is open, the valve chamber is subjected to process pressure. When the valve is closed, the free front face of the piston moves into the valve chamber. When the valve is closed, the piston protrudes at least sufficiently far into the valve chamber that it interrupts the connection between the two channels.

Preferably, a plurality of valves and a plurality of first and second channels are present. Depending on the embodiment, all of the valves are assigned to a single cover. In alternative embodiments, two or more valves are assigned to a common cover and/or individual valves are each assigned to a separate cover. Depending on the embodiment, the device has a plurality of covers which are preferably arranged on different sides of the housing block. Depending on the embodiment, the covers are configured identically or differently. Depending on the embodiment, the covers receive valves of the same configuration or different valves.

Since the second channel runs partially in the cover, the first channel may be configured to be relatively short and the housing block may be configured to be smaller. The valve unit is more compact and requires less space in the blow-moulding apparatus. Moreover, there is greater flexibility for the positioning of the connecting bore for the supply channel.

If at least one part of the valve chamber is arranged in the cover and surrounds the movable piston of the valve, the space requirement is also reduced and the dead spaces minimized. The housing block in this case is preferably configured to be slightly larger than in the first variant. To this end, the cover may be configured to be narrower than in the first variant.

Preferably, an inner wall of the cover forms at least a part of the outer boundary of the valve chamber.

In the first preferred embodiments, an outer front face of the piston is aligned with an outer front face of the cover surrounding the piston. Preferably, the valve chamber is configured approximately entirely, or even entirely, in the cover. This solution optimally shortens the first channel.

In further preferred embodiments, an outer front face of the piston protrudes over an outer front face of the cover surrounding the piston and protrudes into a recess of the housing block. Depending on the embodiment, the second channel is partially arranged in the cover, as before. In other embodiments, the second channel runs in the housing block, wherein a part of the valve chamber is arranged in the cover.

Preferably, the at least one second channel runs partially in the cover and partially in the housing block. This permits both a minimizing of the mass of the cover and of the housing block.

Preferably, the at least one second channel runs with its region adjacent to the associated valve in the cover and runs with its region adjacent to the associated external line in the housing block.

The through-bore in the housing block generally defines a longitudinal direction. Preferably, the piston of the valve or the pistons of the valves are movable in a direction running perpendicular to the longitudinal direction. This is a proven arrangement of blowing valves and/or venting valves. It permits optimal access for replacing the valves of the valve unit which is already in operation.

Preferably, a plurality of valves are arranged in a common cover. The valves are preferably blowing valves and/or venting valves. Preferably, the valves are arranged preassembled in the at least one cover, and together with the at least one cover may be fastened to and/or removed from the housing block. This facilitates the replacement and the assembly. Preferably, therefore, the valves may be releasably fastened to the housing together with the cover.

In preferred embodiments, an inner guide pin, which engages in a central bore of the piston and which is preferably penetrated by a control line for connecting to a pilot valve, is configured in the cover. The cover thus forms a part of the guidance of the piston. As a result, the cover may be configured in a space-saving manner.

Preferably, the piston is surrounded by an outer guide apron, which on its inner side has a circumferential step which forms a control chamber together with an outwardly protruding circumferential step of the piston. The piston is held so as to be guided in this apron. Preferably, the piston is held in the cover by means of this apron.

In preferred embodiments, the guide apron may be releasably fastened in the cover and the piston is movably held in the cover by means of this guide apron. Preferably, the guide apron is releasably fastened by means of screws.

The guide apron preferably forms with its outer side an inner boundary of at least one part of the valve chamber. Preferably, the external diameter of the apron tapers conically. This optimizes the throughflow of the process fluid through the valve in the open state.

The use of a guide apron inside a valve housing, which holds and guides the switching piston and which at least partially forms an inner boundary of at least one part of the valve chamber, is an independent invention and is thus also claimed without the remaining features. This relates, in particular, to such guide aprons which taper in the external diameter thereof and which are, in particular, conically configured.

In a preferred embodiment, the piston is sealed on a seat seal. This seat seal is preferably held by means of a hold-down device in an annular aperture in the housing block. Preferably, the hold-down device is pressed onto the seat seal by means of the cover. This arrangement permits a simple replacement of the seat seal.

In preferred embodiments, the housing block has an annular aperture. The annular aperture preferably has a larger external diameter than the piston arranged above the aperture. The seat seal in the form of a sealing ring is arranged in the annular aperture, the piston in the closed state of the valve sealingly bearing against said sealing ring.

Preferably, a hold-down device which fixes the sealing ring in its position is arranged in the annular aperture. This facilitates the assembly and also the replacement of the sealing ring. Additionally, an optimal closure of the valve is ensured.

In preferred embodiments, the hold-down device is simply inserted and held by the cover. In other embodiments, the hold-down device is additionally or alternatively fastened, for example screwed, to the housing block.

The seat seal and the hold-down device are thus not preassembled in the cover, as is the remaining part of the valve, but they are inserted in the housing block before the assembly of the cover. The fixing may be carried out directly on the housing block and/or by fastening the cover.

The valve apparatus according to the invention of the above-described device has a cover and at least one movable piston of the at least one valve which is releasably fastened in the cover. The valve apparatus is releasably connectable to the housing block as a unit.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF THE INVENTION

The device according to the invention is shown in a first embodiment in FIGS. 1 to 7.

The device is configured as a valve unit. As may be clearly identified in FIGS. 1 and 2, the valve unit has a housing block 1 which is penetrated by a through-bore 10. This through-bore 10 serves for receiving a blowing nozzle of the blow-moulding apparatus, optionally a stretching mandrel being inserted through said blowing nozzle.

The housing block 1 is connected on the rear side thereof to a holding body 2 which serves for fastening to a carrier of the blow-moulding apparatus. Preferably, the holding body 2 is configured as a cradle. The holding body permits thereby the height adjustment of the valve unit.

Figure 1:
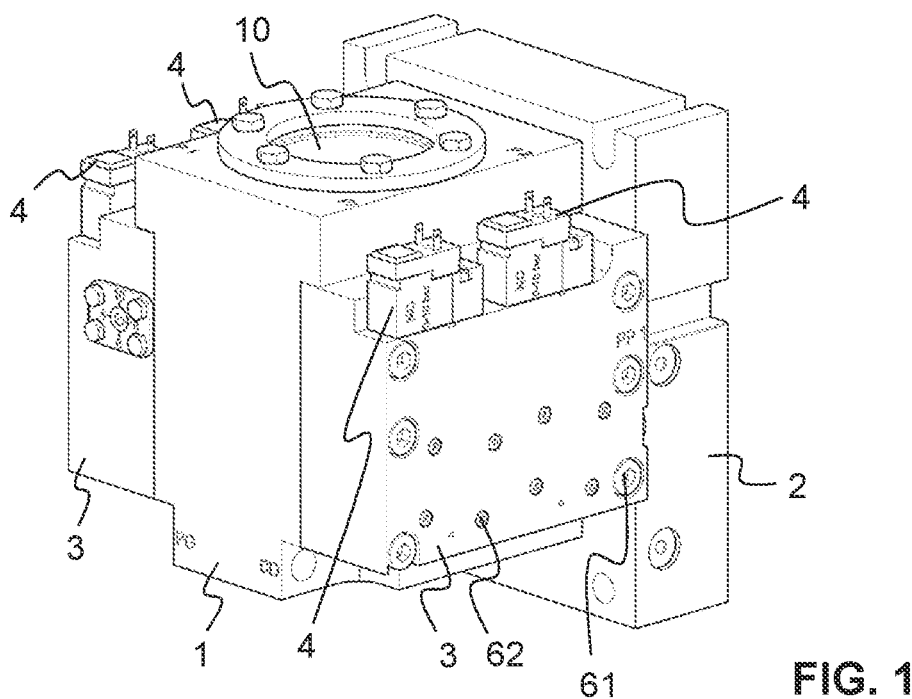
FIG. 1 shows a perspective view of a device according to the invention in a first embodiment.
Figure 2:
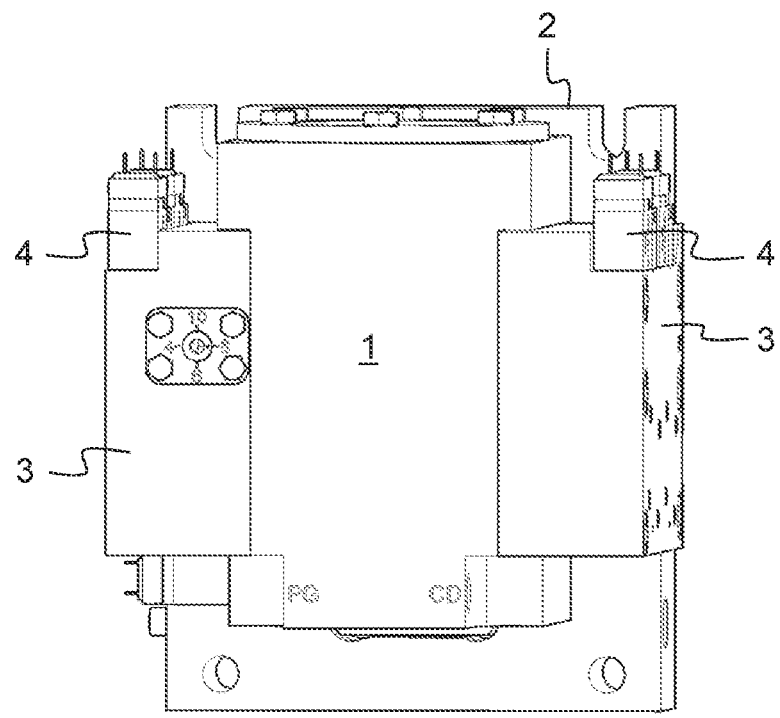
FIG. 2 shows the device according to FIG. 1 in a second perspective view.
Figure 3:
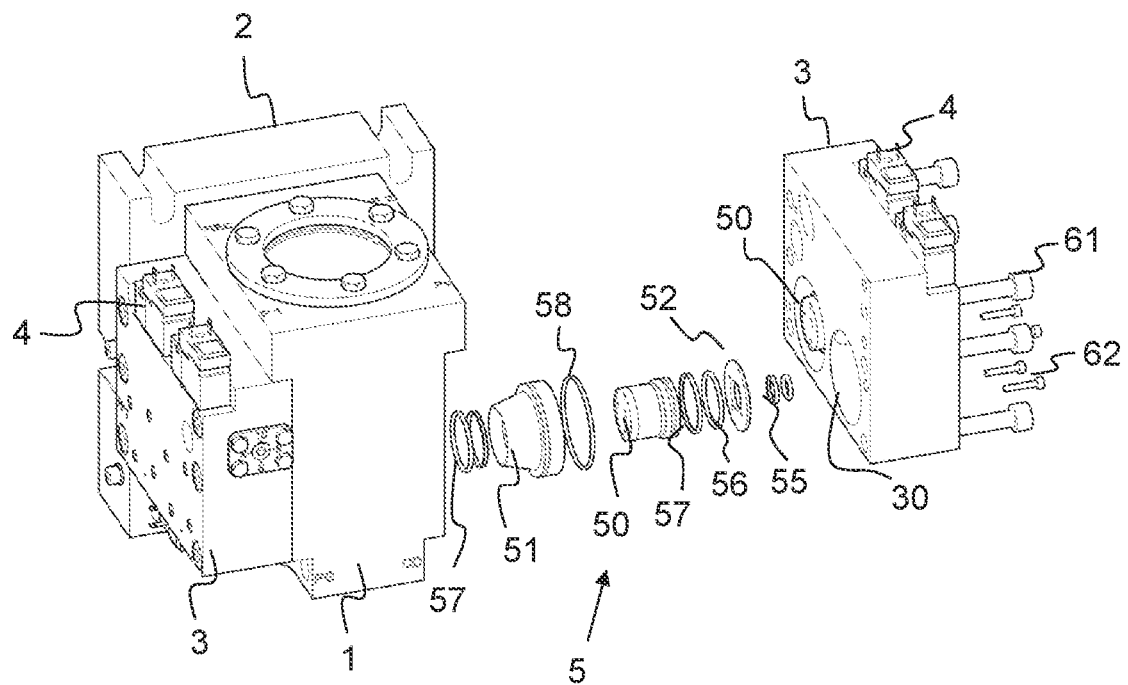
FIG. 3 shows a partial exploded view of the device according to FIG. 1.
Figure 4:
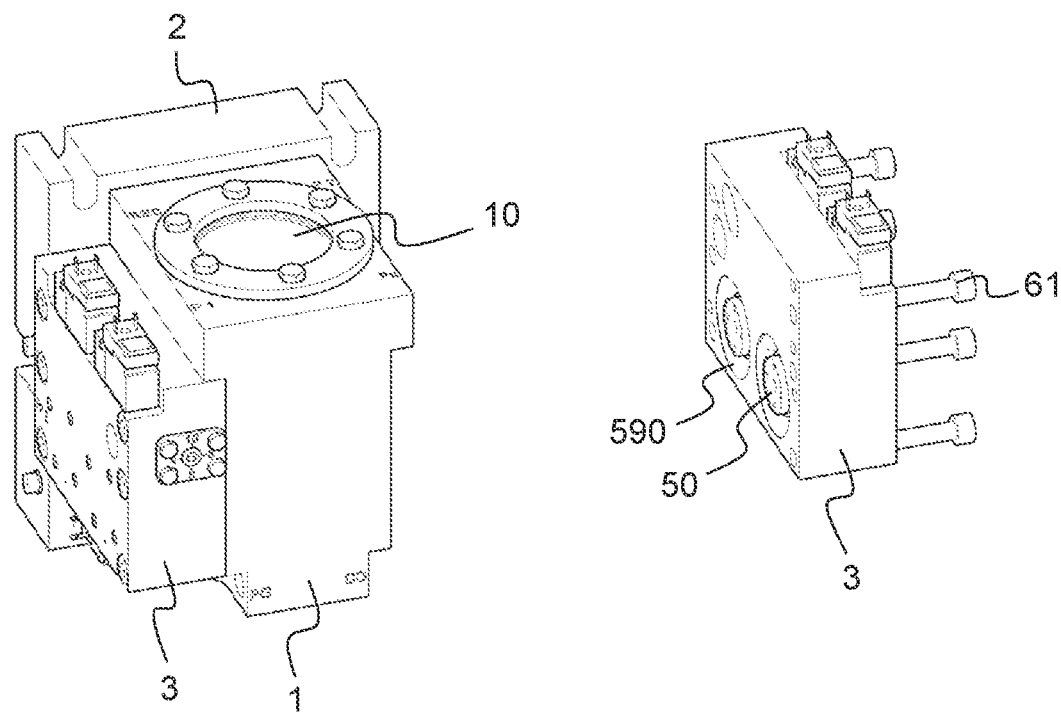
FIG. 4 shows a further partial exploded view of the device according to FIG. 1.

Valve apparatuses are assembled on at least one side, in this case on two opposing sides, of the housing block 1. Each valve apparatus has a cover 3 which encloses process valves 5. This is shown in FIGS. 3 and 4. Preferably pilot valves 4 for controlling the process valves 5 are arranged on the cover 3.

The cover 3 has circular cylindrical apertures 30, which form blind holes, corresponding to the number of valves 5. The base of the blind holes preferably forms a guide pin 31 inwardly protruding into the aperture 30 (FIG. 5).

The valves 5 are inserted from a first side into these apertures 30. The valves are preferably releasably fastened to the cover 3, preferably from the opposing side by means of first fastening screws 61.

The housing block 1 and/or the holding body 2 and/or the covers 3 are preferably configured as solid components which are provided with apertures, bores and channels, where required.

Figure 5:
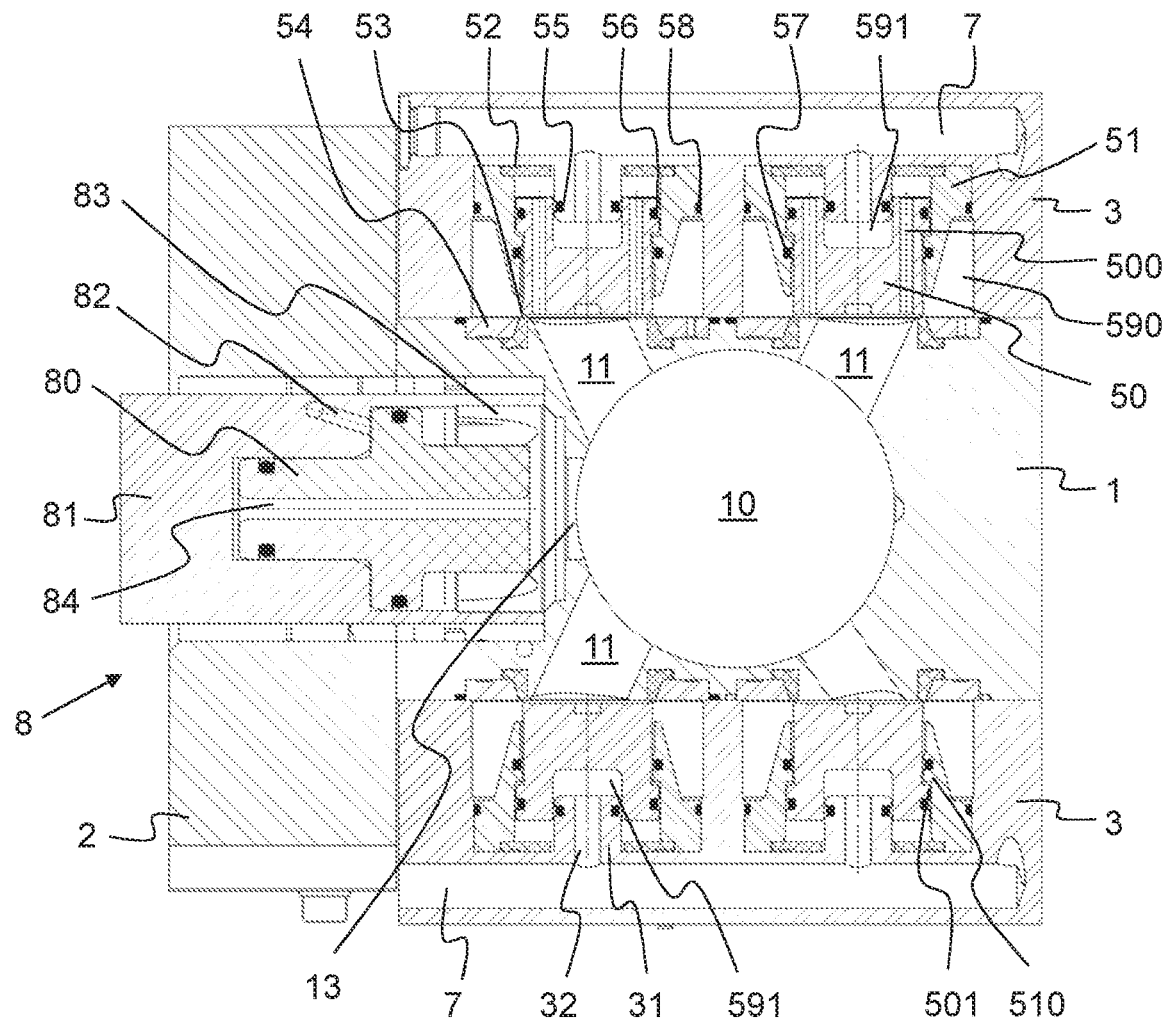
FIG. 5 shows a cross section through the device according to FIG. 1.
Figure 6:
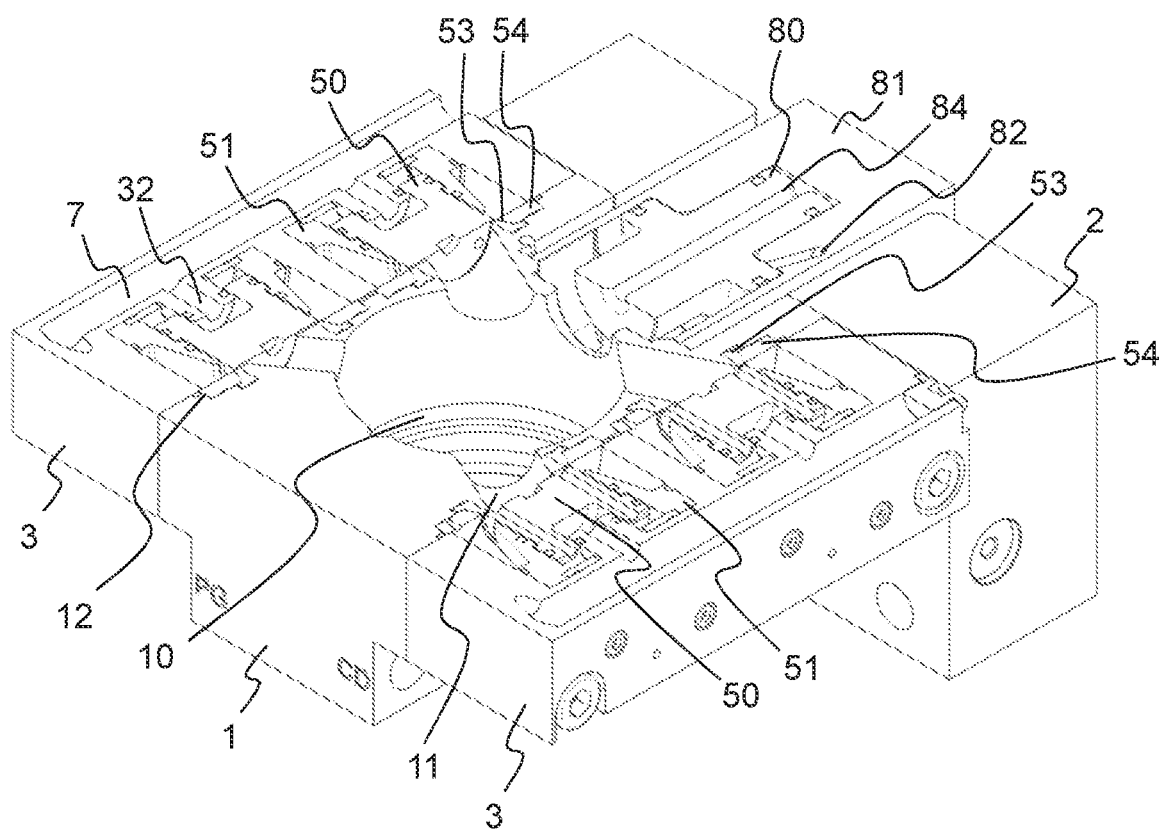
FIG. 6 shows a cross section through a perspective view of the device according to FIG. 1.

As may be identified in FIGS. 5 and 6, in this example two valves 5 are arranged in each cover 3. In this example, the valves are blowing valves, for example pre-blowing valves and main blowing valves. Depending on the embodiment, however, only a single valve or three or more valves are arranged in the same cover 3. The valves 5 are preferably configured identically. The valves may also be different, however, depending on the exemplary embodiment.

Each valve 5 has a movable piston 50. The guide pin 31 engages in a blind hole of the piston 50. The blind hole forms a first control chamber 591. A first sealing ring or a first sealing ring pair 55 forms a dynamic seal between the guide pin 31 and the piston 50 which is displaceable relative thereto. The guide pin 31 is provided with a through-bore 32 which leads into a control channel 7. The first control chamber 591 may be subjected to a first control pressure via this control channel 7.

The piston 50 is surrounded by a guide apron 51. The apron 51 is preferably formed from a rigid material, preferably from metal. The apron 51 is releasably fastened to the cover 3 by means of the second screws 62. The apron 51 has an inwardly protruding circumferential step 510, the piston 50 bearing thereagainst with an outwardly protruding circumferential step 501. As a result, the piston 50 is displaceably held in the cover 3 by means of the apron 51. A second control chamber is configured between the two steps 501, 510. In the figures, the second control chamber is minimized in terms of its size since the valve is shown in the closed state. The second control chamber is connected to the associated pilot valve 4 via a control line.

A second sealing ring 56 and a third sealing ring or a second sealing ring pair 57 form dynamic seals which permit a sealed displaceability of the piston 50 relative to the fixed apron 51. The apron 51 is sealed on the outer circumference thereof relative to the cover 3 by means of a fourth sealing ring 58.

Preferably, a stop ring 52 which preferably consists of a soft, flexible material is present. The stop ring serves as a stop for the piston 50 in the open state of the valve. The stop ring 52 surrounds an outer circumference of the guide pin 31. The stop ring is preferably clamped between a front face of the apron 51 and an inner surface of the cover 3.

The apron 51 is preferably a rotationally symmetrical body with a hollow cylindrical portion which transitions with a uniform internal diameter into a tapering conical shape. The apron 51 guides the piston 50. The valves 5 are shown in the closed state in FIGS. 5 and 6. The piston 50 protrudes over the free conical end of the apron 51.

An annular aperture 12 is present in the housing block 1 for each valve 5. This aperture is preferably larger in diameter than the external diameter of the piston 50. A seat seal 53 is arranged in this annular aperture 12. The seat seal 53 is preferably formed from a soft, resilient annular body. The seat seal 53, as shown here, is preferably fixedly held in the aperture 12 by means of a hold-down device 54. The hold-down device 54 is preferably an annular body made of a rigid material. The hold-down device is preferably clamped by means of the cover 3 and fixed in its position. Alternatively or additionally, the hold-down device is fixed by means of other fastening means to the housing block 1. For example, the hold-down device is screwed directly onto the housing block 1.

The annular aperture 12 of the housing block 1 surrounds a first channel 11 which leads from the through-bore 10 to the valve 5, more specifically to a valve chamber 590. The valve chamber 590 is defined by the inner wall of the aperture 30 and the outer cylindrical surface of the apron 51 and by the piston 50. The first channel 11 leads into this valve chamber 590 and thus connects this valve chamber to the through-bore 10 and the blowing nozzle of the blow-moulding apparatus. At least one pressure-compensation bore running through the piston 50 connects the valve chamber 590 to a second valve chamber 591.

A second channel connects this valve chamber 590 to the supply lines which conduct the process gas, preferably air, into the blow-moulding apparatus. In this example, the supply lines, not shown here, lead into a supply channel 20 of the holding body 2. This may be identified in FIGS. 6 and 7. The supply channel 20 leads into a first part 14 of the second channel, wherein the first part 14 runs in the housing block 1. The first part 14 leads into a second part 33 of the second channel, wherein the second part 33 runs in the cover 3 and leads into the valve chamber 590 of the valve 5. Each valve preferably has a single line combination with a supply channel 20 and second channel 14, 33.

When the valve 5 is closed, the piston 50 bears against the seat seal 53 and thus closes the first channel 11. The piston thus interrupts the connection between the first channel 11 and the second channel, more specifically the second part 33 of the second channel. In the open state of the valve 5, the piston 50 bears against the stop ring 52. A through-passage between the free end of the apron 51 and the seat seal 53 is opened up and the two channels are connected together via the valve chamber 590. The process valve may be controlled by means of the pilot valve 4, more specifically by means of the control pressures in the control chambers. This takes place, in particular, when the piston is configured to be pressure-compensated relative to the process pressure.

In this exemplary embodiment, the device comprises at least one further valve which serves as a venting valve 8. This valve is arranged on the rear side of the device in this example. However, the valve may also be arranged at a different point of the housing block 1.

The venting valve 8 penetrates an aperture of the holding body 2 and preferably protrudes into an aperture of the housing block 1.

The venting valve 8 has in turn a movable piston 80 which is held so as to be guided in a cover 81. The cover 81 is preferably releasably fastened, preferably screwed, to the housing block 1 or to the holding body 2.

The housing block 1 has a venting channel 13 which leads to a valve chamber 83 of the venting valve 8. The venting valve 8 is shown in the figures in the open state. A pressure-compensation bore 84 and a pressure-compensation chamber 85 (FIG. 11) facilitate holding the venting valve 8 closed.

Preferably, the venting valve is also controlled by means of a pilot valve, not shown here. A control channel 82 leads to the piston 80. A control chamber 86 of the venting valve may be identified in FIG. 11.

A second embodiment is shown in FIGS. 8 to 13. The second embodiment is of similar construction to the first embodiment. The above description is thus also relevant to the second embodiment, when no alteration is specified hereinafter.

Figure 8:
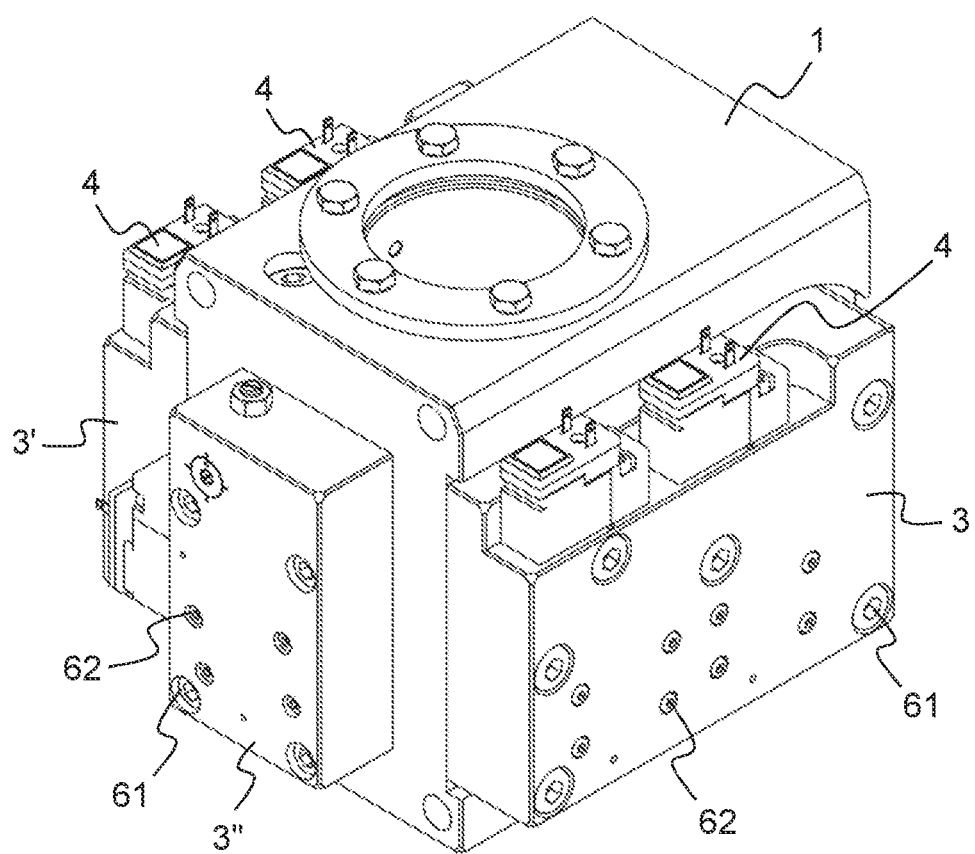
FIG. 8 shows a perspective view of a device according to the invention in a second embodiment.

In FIG. 8 the valve unit is shown. The holding body 2 in the form of a connecting flange is not shown here. However, the holding body is also present on the rear side of the housing block 1 or integrally configured with the housing block 1.

Figure 9:
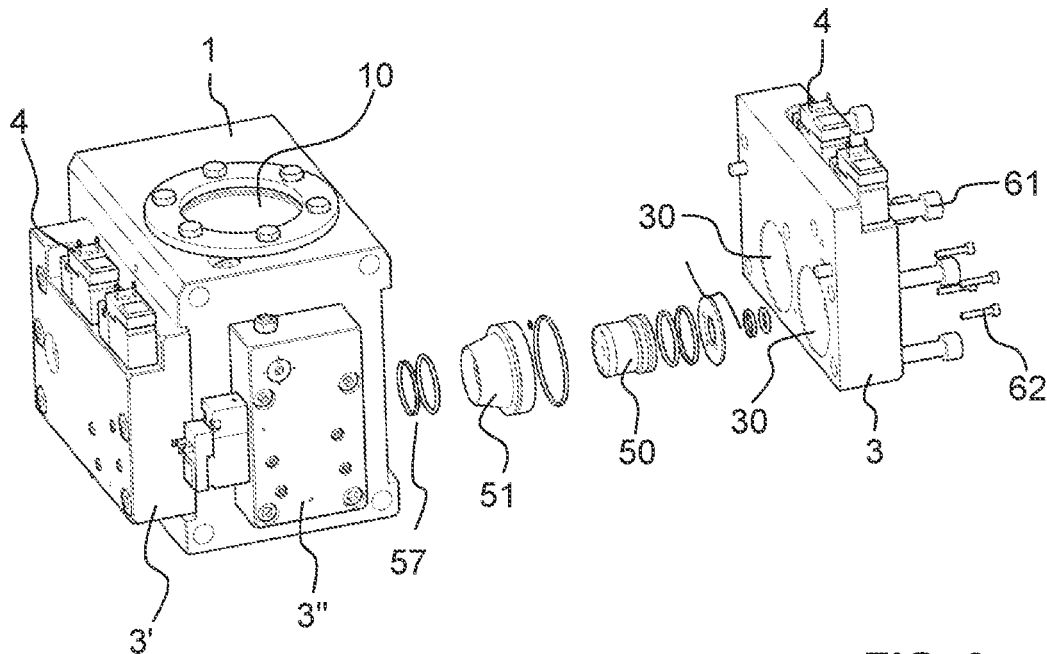
FIG. 9 shows a partial exploded view of the device according to FIG. 8.
Figure 10:
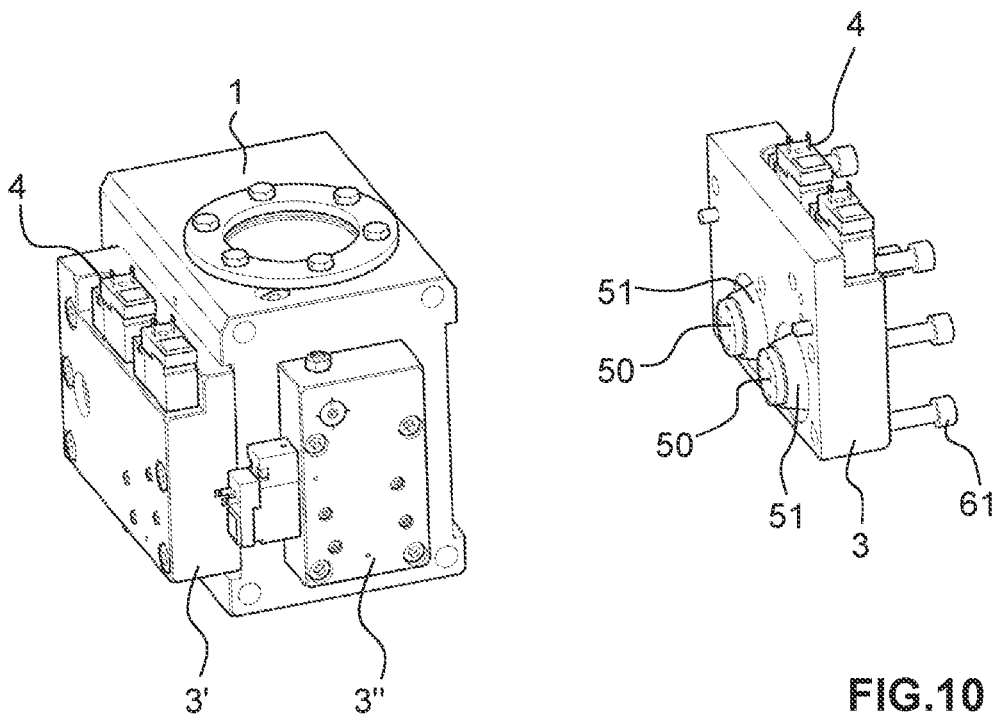
FIG. 10 shows a further partial exploded view of the device according to FIG. 8.

As shown in FIGS. 9 and 10 the cover 3 is preferably configured to be narrower than in the first exemplary embodiment. The housing block 1 is preferably wider than in the first exemplary embodiment.

As may also be identified in FIGS. 9 and 10, the valve 5 has the same parts received in the cover 3 as in the first exemplary embodiment. However, these parts are not received fully in the aperture 30 of the cover 3, as may be identified in FIG. 4. Instead they protrude partially from an outer surface of the cover 3.

Figure 11:
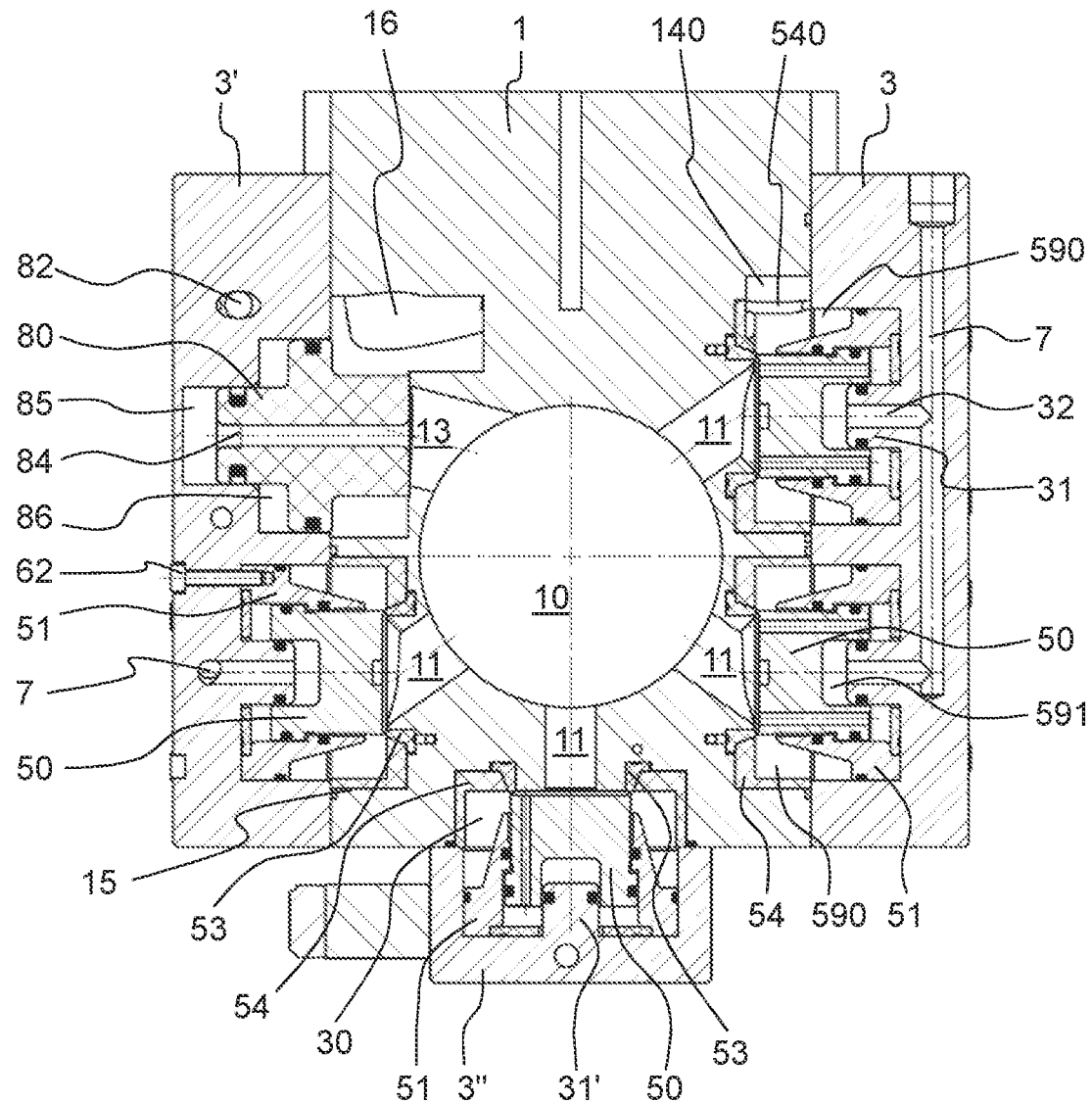
FIG. 11 shows a cross section through the device according to FIG. 8.
Figure 12:
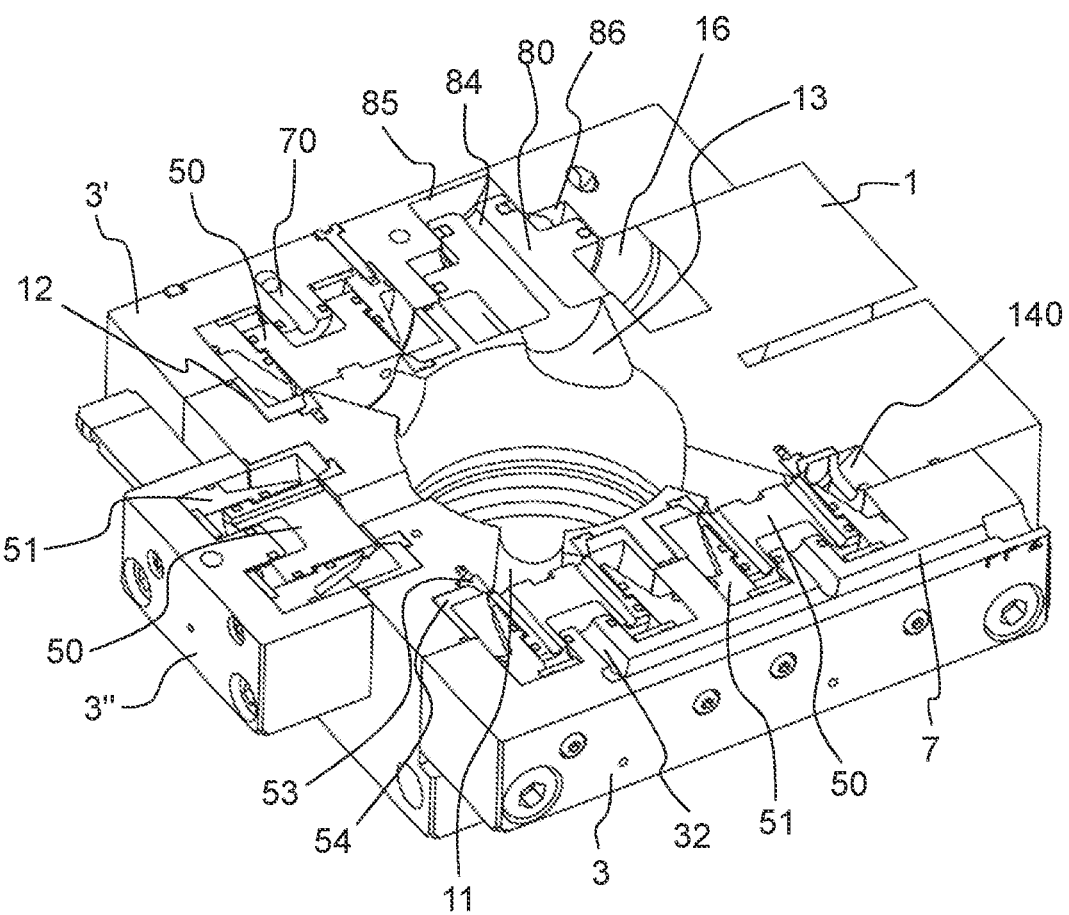
FIG. 12 shows a cross section through a perspective view of the device according to FIG. 8

In FIGS. 11 and 12 it may be identified that the blowing valves 5 are of the same configuration as in the first exemplary embodiment. The guide pin 31, 31' of the cover 3, 3', 3" protrudes in turn into the control chamber of the valve 5 and guides the piston 50. The piston 50 is also surrounded and guided by the apron 51. The apron 51 has the same shape as in the first exemplary embodiment. The control channel 7 for connecting to the pilot valves 4 is present in the cover 3. The cover 3 bears one valve, two valves, or three or more valves, depending on the embodiment.

The housing block 1 preferably has a cylindrical recess 15 adapted to each valve 5. In each case the annular aperture 12 is arranged in the bottom of this recess 15. The annular seat seal 53 and the hold-down device 54 are located in the annular aperture 12. In contrast to the first exemplary embodiment, the hold-down device 54 preferably has a circumferential cylindrical surface which bears against the inner side of the recess 15 and is releasably fixed by the assembled cover 3. Alternatively or additionally, the hold-down device 54 may be releasably fastened directly in the recess 15, for example by means of screws.

The valves 5 are shown in the closed state. The valves bear against the seat seal 53. In this case, the valves protrude into the recess 15 of the housing block 1. Depending on the size of the recess, the free end of the apron 51 protrudes more or less, or not at all, into the recess 15.

A channel for the process gas is not arranged in the cover 3. The second channel runs exclusively in the housing block 1 and does not have a portion in the cover 3. The second channel is provided with the reference numeral 140 in the figures. As before, however, a part of the valve chamber 590 is arranged in the cover 3, as may be clearly identified in FIGS. 11 and 12. The hold-down device 54 has a through-opening 540 through which the second channel 140 leads into the valve chamber 590. The through-opening is visible in FIGS. 11 and 12 in the right-hand cover 3 in the upper valve 5. The through-openings of the remaining hold-down device 54 are not visible.

The cover 3' on the opposing left-hand side in FIGS. 11 and 12 is not configured identically to the first exemplary embodiment. Instead it accommodates a blowing valve 5 and a venting valve 8. The blowing valve 5 is of the same configuration as that already described. The venting valve 8 corresponds in terms of basic design to that already described. However, the venting valve does not have a separate cover but shares the cover 3' with the adjacently arranged blowing valve 5. The venting line 16 runs exclusively in the housing block 1. The control channel 82 of the venting valve 8 is arranged in the cover 3'. The control line 7 for the blowing valve 5 is also present. In this valve 5, the second fastening screw 62 for fastening the apron 51 and thus the piston 50 in the cover is also visible.

In this example a further, in this case a fourth, blowing valve is arranged on a front face of the housing block 1 in a separate cover 3". This further blowing valve 5 is preferably of the same configuration as the remaining blowing valves. Generally, a total of four blowing valves 5, which are preferably configured identically, are used.

Figure 13:
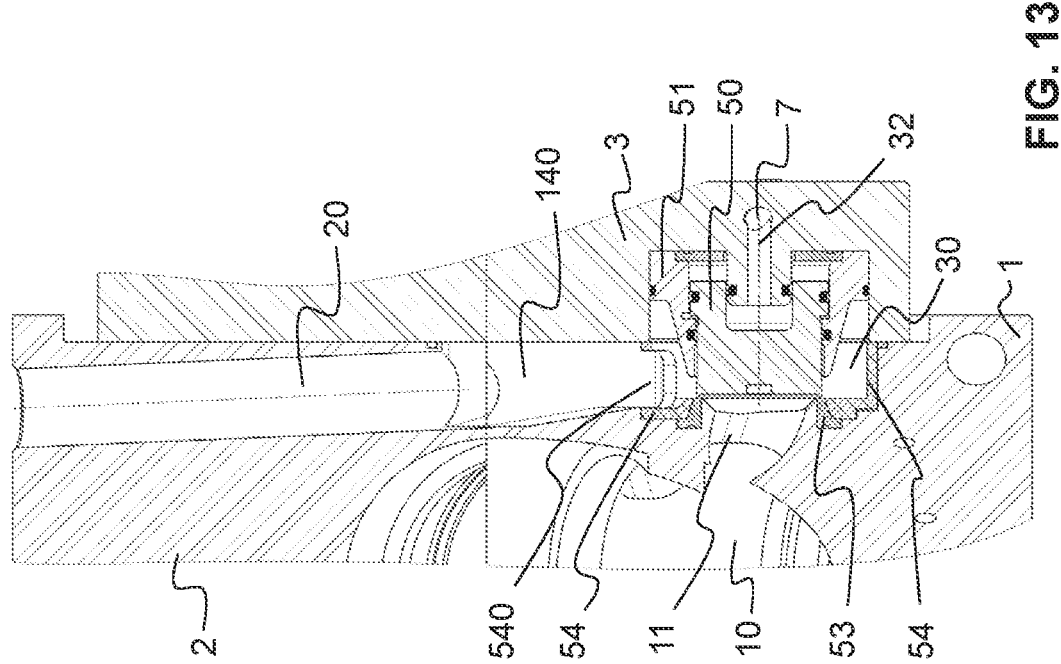
FIG. 13 shows a further cross section which shows a part of the device according to FIG. 8.
Figure 7:
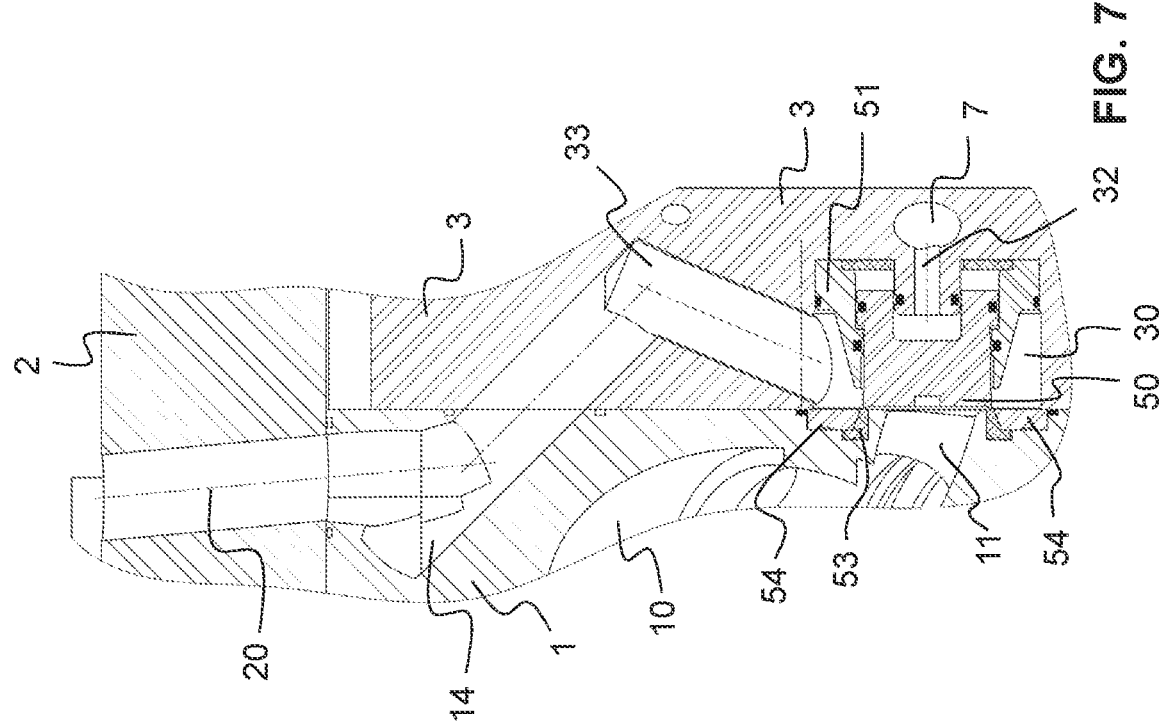
FIG. 7 shows a further cross section which shows a part of the device according to FIG. 1.

In FIG. 13 it may be identified how the second channel 140 runs entirely in the housing block 1 and transitions into the supply channel 20 of the holding body 2. The second channel 140 leads into the valve chamber 590.

In some of the valves, the pressure-compensation bores 500 and the through-bore 32 may not be identified in the figures. Moreover, the second channel leads, or the second channels 140 lead, to these valves 5 but they are not all visible in the figures. This is partially due to the selected cutting planes. However, they are generally present.

The device according to the invention may be of compact configuration and minimized in terms of size, wherein the valves may be assembled and replaced in a simple and rapid manner. The valves are also easily accessible.

The invention claimed is:

1. A device of a blow-moulding apparatus for moulding hollow bodies, the device comprising:
    a housing block with a through-bore for at least partially receiving a blowing nozzle of the blow-moulding apparatus which may be connected to the hollow body,
    at least one valve with a movable piston and with a valve chamber,
    a first channel which runs in the housing block and which connects the valve chamber to the through-bore,
    a second channel which connects the valve chamber to an external line and
    a cover for fastening the valve to the housing block,
    wherein the valve connects the first channel and the second channel to one another and separates them from one another,
    and wherein at least one of the following applies:
        the second channel runs at least partially in the cover, or
        at least one part of the valve chamber is arranged in the cover and surrounds the piston.

2. The device according to claim 1, wherein an outer front face of the piston is aligned with an outer front face of the cover surrounding the piston.

3. The device according to claim 1, wherein an outer front face of the piston protrudes over an outer front face of the cover surrounding the piston and protrudes into a recess of the housing block.

4. The device according to claim 1, wherein the second channel runs partially in the cover and partially in the housing block.

5. The device according to claim 4, wherein the second channel runs with its region adjacent to the valve in the cover and runs with its region adjacent to the external line in the housing block.

6. The device according to claim 1, wherein the through-bore defines a longitudinal direction and wherein the piston is movable in a direction running perpendicular to the longitudinal direction.

7. The device according to claim 1, wherein two or more valves are present and wherein at least two of these valves are arranged in a common cover.

8. The device according to claim 1, wherein the at least one valve is arranged preassembled in the at least one cover, and together with the cover may be fastened to and/or removed from the housing block.

9. The device according to claim 1, wherein an inner guide pin, which engages in a central bore of the piston and which is penetrated by a control line for connecting to a pilot valve, is configured in the cover.

10. The device according to claim 1, wherein the piston is surrounded by an outer guide apron which holds the piston and which at least partially forms an inner boundary of at least one part of the valve chamber.

11. The device according to claim 10, wherein the guide apron may be releasably fastened in the cover and wherein the piston is movably held in the cover by means of this guide apron.

12. The device according to claim 1, wherein the housing block has an annular aperture which has a larger external diameter than a piston of the valve arranged above the annular aperture, and wherein a sealing ring is arranged in the aperture, the piston in the closed state of the valve sealingly bearing against said sealing ring.

13. The device according to claim 12, wherein a hold-down device which fixes the sealing ring in its position is arranged in the annular aperture.

14. The device according to claim 13, wherein the hold-down device is held in its position by means of the cover.

15. A valve unit of a device of a blow-moulding apparatus for moulding hollow bodies, the device comprising:
a housing block with a through-bore for at least partially receiving a blowing nozzle of the blow-moulding apparatus which may connect to the hollow body,
at least one valve with a movable piston and with a valve chamber,
a first channel which runs in the housing block and which connects the valve chamber to the through-bore,
a second channel which connects the valve chamber to an external line and
a cover for fastening the valve to the housing block,
wherein the valve connects the first channel and the second channel to one another and separates them from one another,
wherein at least one of the following applies;
the second channel runs at least partially in the cover; or
at least one part of the valve chamber is arrange in the cover and surrounds the piston,
wherein the valve unit comprises the cover and the movable piston of the at least one of the at least one valve,
wherein the movable piston is releasably fastened in the cover,
and wherein the valve unit is releasably connectable to the housing block as a unit.

16. The device according to claim 1, wherein the blow-moulding apparatus is a stretch blow-moulding machine.

17. The valve unit according to claim 15, wherein the blow-moulding apparatus is a stretch blow-moulding machine.

18. The device according to claim 1, wherein the piston comprises a free front face and wherein the free front face is moveable into the valve chamber when the valve is closed.

19. The device according to claim 1, wherein the valve chamber is a space into which the first channel and the second channel lead and which is defined by the piston, and wherein, when the valve is open, the valve chamber is subjectable to a process pressure.

20. The device according to claim 18, wherein the valve chamber is a space into which the first channel and the second channel lead and which is defined by the piston, and wherein, when the valve is open, the valve chamber is subjectable to a process pressure.

21. The device according to claim 15, wherein the piston comprises a free front face and wherein the free front face is moveable into the valve chamber when the valve is closed.

22. The device according to claim 15, wherein the valve chamber is a space into which the first channel and the second channel lead and which is defined by the piston, and wherein, when the valve is open, the valve chamber is subjectable to a process pressure.

23. The device according to claim 21, wherein the valve chamber is a space into which the first channel and the second channel lead and which is defined by the piston, and wherein, when the valve is open, the valve chamber is subjectable to a process pressure.

* * * * *